D. A. DECKER.
SAFETY RATCHET.
APPLICATION FILED MAR. 24, 1919.

1,325,464.

Patented Dec. 16, 1919.
2 SHEETS—SHEET 1.

Witnesses
Geo. E. Logan

Inventor
Delos A. Decker

By Victor J. Evans
Attorney

D. A. DECKER.
SAFETY RATCHET.
APPLICATION FILED MAR. 24, 1919.

1,325,464.

Patented Dec. 16, 1919.
2 SHEETS—SHEET 2.

Witnesses
Geo. E. Logan

Inventor
Delos A. Decker

By Victor J. Evans
Attorney

UNITED STATES PATENT OFFICE.

DELOS A. DECKER, OF SAYRE, PENNSYLVANIA.

SAFETY-RATCHET.

1,325,464.  Specification of Letters Patent.  Patented Dec. 16, 1919.

Application filed March 24, 1919. Serial No. 284,568.

*To all whom it may concern:*

Be it known that I, DELOS A. DECKER, a citizen of the United States, residing at Sayre, in the county of Bradford and State of Pennsylvania, have invented new and useful Improvements in Safety-Ratchets, of which the following is a specification.

This invention relates to machine elements, particularly to safety ratchets, and has for its object the provision of a novel connection between a driving and a driven shaft, the connection being equipped with normally spring retained means establishing operative connection between the shafts and so arranged that the shafts will be automatically disconnected so that they will have relative rotary movement upon an undue strain upon one of the shafts whereby to prevent breaking of the gears or other driving mechanism associated with the drive shaft, the device being particularly adapted for use upon lathes, especially when the lathe is operating for cutting screw threads.

An important object is the provision of a device of this character in which the operating parts of the connection are entirely inclosed whereby not only to exclude dirt and the like, but also to prevent injury to the operator by contact with any of the moving parts.

A further object is the provision of a device of this character which will be simple and inexpensive in manufacture, highly efficient and durable in use, and a general improvement in the art.

With the above and other objects and advantages in view, the invention consists in the details of construction to be hereinafter more fully described and claimed, and illustrated in the accompanying drawings, in which—

Figure 1:
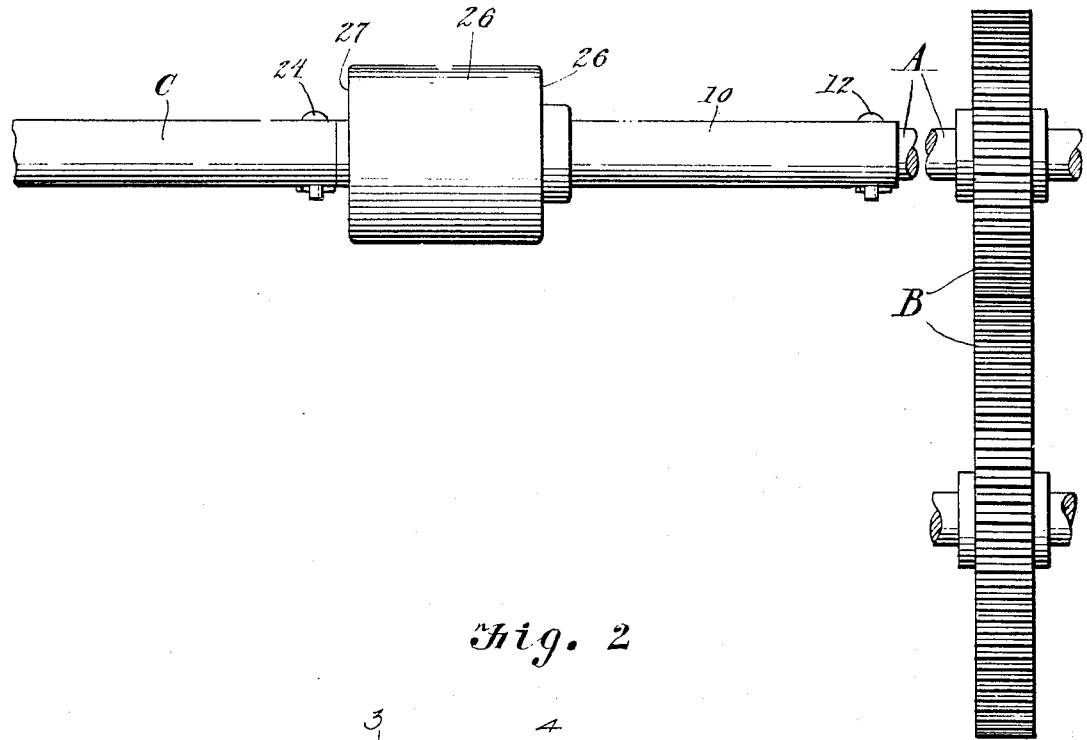
Figure 2:
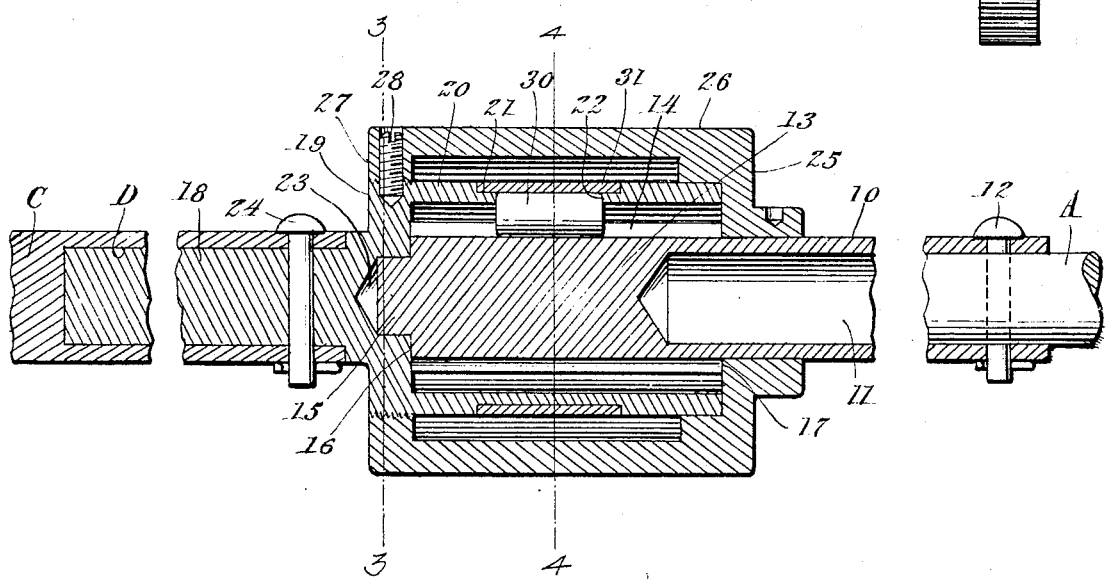
Figure 3:
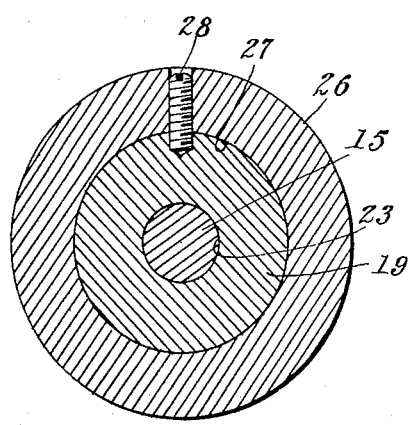
Figure 4:
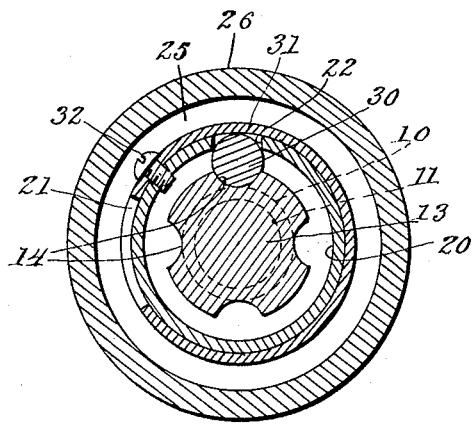
Figure 5:
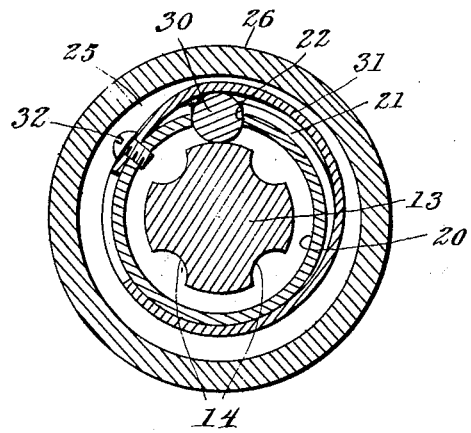

Figure 1 is a side elevation of the device showing it associated with a gear driven driving shaft and the ultimate driven shaft, Fig. 2 is a longitudinal sectional view, Fig. 3 is a cross sectional view on the line 3—3 of Fig. 2, Fig. 4 is a cross sectional view on the line 4—4 of Fig. 2, showing the normal position of the parts, and, Fig. 5 is a view similar to Fig. 4 showing the parts as disconnected.

Referring more particularly to the drawings, the letter A designates a driven shaft which is operated, for example, by a train of gears B.

In carrying out my invention, I provide a member formed as a shaft 10 provided with a socket 11 engaged upon the end of the driven shaft A and secured thereto by any suitable means such as a pin 12 extending transversely through the shaft 10 and the shaft A. One end of the shaft member 10 is somewhat enlarged to provide a head 13 which is provided with a plurality of longitudinally extending recesses 14 arcuate in cross section, as shown. The enlarged head 13 terminates in a reduced extension 15 defining a shoulder 16. At the other end of the head 13 is defined a shoulder 17.

The numeral 18 designates a stub shaft which has one end enlarged to provide a flange 19 from which extends a cylindrical sleeve 20 which is provided externally with a circumferential groove 21 and which is provided internally with an opening 22 communicating with the groove 21. The flange 19 is provided centrally with a socket 23 receiving the reduced extension 15 formed upon the end of the head 13. The sleeve 20 is of such diameter that its internal periphery will be spaced from the external periphery of the head 13, as clearly shown. When the member 18 is associated with the member 10, the end face of the flange 19 will abuttingly engage the shoulder 16 formed adjacent the reduced extension 15 on the head 13. The ultimate driven shaft C is provided with a socket D engaging upon the stub shaft 18 and secured thereto by any suitable means such as a pin 24 passing through the shaft C and the stub shaft 18.

Disposed upon the shaft member 10 is a casing member 25 which has its inner end wall abutting against the shoulder 17 at the end of the head 13 and which includes a cylindrical portion 26 disposed in spaced relation to the sleeve 20 and which is provided at its open end with an inwardly extending flange 27 engaging the outer periphery of the flange 19. A set screw 28 is threaded through the flange 27 and engages within a hole formed in the periphery of the flange 19. From this construction it will be understood that the casing 25 is rigid with respect to the flange 19, stub shaft 18, and sleeve 20, and revoluble with respect to the shaft member 10 and head 13.

In order to establish connection between the head 13 and sleeve 20, I provide a roller 30 which is engaged within any one of the longitudinal recesses 14 in the head 13 and which is disposed within the opening 22 in the sleeve 20. A split spring ring 31 is disposed within the groove 21 in the sleeve 20 and partially embraces the sleeve 20, this ring member having one end free and having its other end secured by a screw 32 passing through the ring member and through the sleeve 20. This ring bears against the outer edge of the roller 30 and holds the roller in engagement with any one of the grooves or recesses 14.

With the parts thus assembled, it will be seen that when the shaft A is rotated, the shaft member 10 and head 13 will also be rotated and by virtue of the roller 30 engaging the head 13 and sleeve 20, the sleeve 20, flange 19, stub shaft 18, and consequently the ultimate shaft C will also be driven. In the event that undue strain is placed upon the ultimate shaft D, for any cause, the driving strain of the head 13 will cause the roller 30 to be pressed outwardly against the resistance of the ring member 31, causing the ring member 31 to be sprung outwardly whereupon the head 13 will rotate relative to the sleeve 20, thereby preventing breakage of any tool or the like driven by the ultimate shaft C. It is of course understood that in such an event, as the head 13 rotates and forces the roller B outwardly, the roller will snap into the successive grooves or recesses 14 but that driving connection is discontinued until the undue strain is removed from the ultimate shaft C, whereupon operative connection will be reëstablished.

From the foregoing description and a study of the drawings, it will be apparent that I have thus provided a simple device for interposition between driving and driven shafts whereby operative connection under normal conditions will be maintained between the shafts but whereby the driving connection will be interrupted in the event of undue strain upon the driven shaft. It will be apparent that the device is very useful in a great many locations and with many different machines for preventing stripping of the driving gears or other injury.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:—

1. In combination with a driving and a driven shaft, a member rigidly connected with the driving shaft and provided with a series of longitudinal grooves, a second member rigidly secured to the driven shaft and rotatable with respect to said first named member, said second named member including a sleeve portion surrounding said first named member in spaced relation thereto, said sleeve member being provided with an opening, a roller engaged within said opening and within one of the longitudinal grooves in said first named member, and a split ring surrounding said sleeve and secured thereto at one end, said ring bearing upon the outer portion of the roller for holding said roller in engagement with said first named member whereby to establish driving connection between said first and second named members.

2. In combination with a driving and a driven shaft, a ratchet device interposed between said shafts and comprising a member rigidly secured to said driving shaft and including a head portion provided with longitudinal grooves, a second member rigidly secured to the driven shaft and including a flange and a sleeve portion extending therefrom in spaced concentric relation to said first named member, said sleeve portion being provided in its outer periphery with a circumferential groove and being further provided in its inner periphery with an opening extending into said groove, a roller engaging within said opening and within any one of the grooves in said head, a split ring disposed within said groove in partially encircling relation to said sleeve and secured to said sleeve at one end, said ring bearing against the outer portion of said roller for maintaining said roller in engagement with said head, and a casing disposed upon said first named member and revoluble with respect thereto, said casing including a cylindrical portion spaced from and surrounding said sleeve and secured to said flange.

In testimony whereof I affix my signature.

DELOS A. DECKER.